(12) United States Patent
Guthrie

(10) Patent No.: US 12,728,048 B2
(45) Date of Patent: Sep. 8, 2026

(54) CUSHION ASSEMBLY

(71) Applicant: Gulfstream Aerospace Corporation, Savannah, GA (US)

(72) Inventor: Joe Guthrie, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 125 days.

(21) Appl. No.: 18/654,096

(22) Filed: May 3, 2024

(65) Prior Publication Data

US 2024/0382355 A1 Nov. 21, 2024

Related U.S. Application Data

(60) Provisional application No. 63/502,272, filed on May 15, 2023.

(51) Int. Cl.
*B64D 11/06* (2006.01)
*A61G 1/017* (2006.01)
*A61G 1/044* (2006.01)

(52) U.S. Cl.
CPC ............. *A61G 1/044* (2013.01); *A61G 1/017* (2013.01); *B64D 11/0641* (2014.12); *A61G 2220/10* (2013.01)

(58) Field of Classification Search
CPC .... A61G 1/044; A61G 1/017; A61G 2220/10; A61G 1/06; B64D 11/0641
See application file for complete search history.

(56) References Cited

U.S. PATENT DOCUMENTS

| | | | | |
|---|---|---|---|---|
| 2,394,264 A | | 2/1946 | Robinson | |
| 4,115,884 A | * | 9/1978 | Keogh | B64D 11/00 296/19 |
| 8,938,828 B2 | * | 1/2015 | Kenalty | A61G 1/044 5/81.1 HS |
| 10,349,622 B2 | * | 7/2019 | Price | A01K 1/029 |
| 10,932,963 B2 | * | 3/2021 | Kenalty | A61G 1/048 |
| 11,744,749 B2 | * | 9/2023 | Kenalty | A61G 1/013 5/627 |
| 11,911,318 B2 | * | 2/2024 | Kenalty | A61G 1/044 |

(Continued)

FOREIGN PATENT DOCUMENTS

| | | | | |
|---|---|---|---|---|
| CN | 102361795 B | * | 7/2015 | B64D 11/064 |
| CN | 1107750002 B | | 4/2022 | |

(Continued)

*Primary Examiner* — Justin M Benedik
(74) *Attorney, Agent, or Firm* — Ingrassia Fisher & Lorenz, LLP

(57) ABSTRACT

A cushion assembly disclosed herein. The cushion assembly is configured for use with a support surface having a first restraint component and a second restraint component spaced apart from the first restraint component. The cushion assembly includes, but is not limited to, a cushion. The cushion assembly further includes, but is not limited to, a first engagement component that is coupled with the cushion. The first engagement component is configured to engage the first restraint component. The cushion assembly still further includes, but is not limited to, a second engagement component coupled with the cushion. The second engagement component is configured to engage the second restraint component.

20 Claims, 13 Drawing Sheets

(56) References Cited

U.S. PATENT DOCUMENTS

| | | | | |
|---|---|---|---|---|
| 2007/0180625 | A1* | 8/2007 | Walke | A61G 7/0504 5/706 |
| 2010/0005593 | A1* | 1/2010 | Bowling | A61G 1/013 5/628 |
| 2017/0197720 | A1* | 7/2017 | Kiraz | B64D 11/0647 |
| 2018/0005523 | A1 | 1/2018 | Cahan et al. | |
| 2018/0177649 | A1* | 6/2018 | Kenalty | A61G 1/013 |
| 2021/0177677 | A1* | 6/2021 | Kenalty | A61G 1/048 |

FOREIGN PATENT DOCUMENTS

| | | | | |
|---|---|---|---|---|
| DE | 2318964 | A1 * | 10/1974 | |
| FR | 2798842 | A1 * | 3/2001 | A61G 3/00 |
| FR | 27988412 | B | 3/2002 | |
| WO | WO-2023183979 | A1 * | 10/2023 | A61G 1/044 |

* cited by examiner 30
34

6
30
32
48
50
34
44
34
40
46
42
6

CUSHION ASSEMBLY

CROSS-REFERENCE TO RELATED APPLICATIONS

This application claims the benefit of U.S. Provisional Application No. 63/502,272, filed May 15, 2023, which is hereby incorporated herein by reference in its entirety.

TECHNICAL FIELD

The present invention relates furniture and more specifically to a table arrangement and a table extension assembly for use with the table arrangement.

BACKGROUND OF THE INVENTION

Some vehicles provide berthing accommodations for a passenger that permits the passenger to lie horizontally while in transit. Such vehicles include, but are not limited to, aircraft, buses, trains, ships, spacecraft and the like. While the passenger is lying down in the vehicle, they must be able to secure themselves to the surface they are resting on to avoid becoming dislodged from the surface as a result of an acceleration, a deceleration, a change in direction, an onset of turbulence, a descent, or any other vehicle motion or external force acting on the passenger.

In a conventional arrangement onboard an aircraft, there may be two passenger seats that are spaced apart from one another with each seat being configured to support a passenger in an upright position. These two passenger seats may also be configured to fold flat and, when folded flat, to cooperate with one another to form a flat berthing accommodation having a flat and horizontal upper surface that facilitates the passenger's ability to lie down and to sleep while the vehicle is in transit. When the two passenger seats are arranged in this manner, this will be referred to herein as a "berthing configuration". While in the berthing configuration, the seatbelts for the two seats are not well positioned to provide suitable restraint to the passenger because they are disposed at upper and lower regions of the person's body while the person is in the lying down position.

A conventional solution to this inconvenient seatbelt positioning entails providing an arrangement of straps that are configured to engage with each seat's existing seatbelt to provide a fastening belt that crosses over the mid-rift of the passenger's body. This conventional solution entails an H-shaped configuration of straps whereby opposite ends of the elongate portions of the H-shaped straps engage with the seatbelts of the opposing seats and whereby the laterally extending central portion of the H-shaped straps that adjoins the elongate portions together serves as the belt that passes over the passenger's mid-rift. While this solution is effective, there is room for improvement.

Relatedly, while these seats may be suitably comfortable for supporting a passenger in a seated position while the seats are in their upright configurations, they often lack a desired level of cushioning necessary to comfortably support a passenger in a horizontal orientation. To accommodate this, a sleep pad is often used by passengers to provide additional cushioning. A sleep pad is an elongate cushion having a length that is sufficient to support the majority, if not the entirety of a human body in a horizontal orientation. The sleep pad is conventionally placed over the upper surface of the horizontal portions of the seats while the seats are arranged in the berthing configuration.

To employ the sleep pad in conjunction with the H-shaped conventional arrangement of straps, first the longitudinal portions of the H-shaped conventional arrangement of straps are fastened to the seatbelts of the seats in the berthing configuration, but leaving the laterally extending central strap unfastened. The sleep pad is then placed on the seats in the berthing configuration on top of the longitudinal portions of the H-shaped conventional arrangement of straps. A passenger then lies down on top of the sleep pad and fastens the laterally extending central strap around his or her mid-rift. In this manner, the passenger can be properly restrained when laying on top of the sleep pad with the seats in the berthing configuration. While this arrangement is effective, it leaves room for improvement.

Accordingly, it is desirable to provide an accommodation that addresses one or more of the foregoing issues. Furthermore, other desirable features and characteristics of the various embodiments described herein will become apparent from the subsequent detailed description and the appended claims, taken in conjunction with the accompanying drawings and this background.

BRIEF SUMMARY

Various non-limiting embodiments of a cushion assembly are disclosed herein

In a first non-limiting embodiment, the cushion assembly is configured for use with a support surface having a first restraint component and a second restraint component spaced apart from the first restraint component. The cushion assembly includes, but is not limited to, a cushion. The cushion assembly further includes, but is not limited to, a first engagement component that is coupled with the cushion. The first engagement component is configured to engage the first restraint component. The cushion assembly still further includes, but is not limited to, a second engagement component coupled with the cushion. The second engagement component is configured to engage the second restraint component.

In a second non-limiting embodiment, the cushion assembly is configured for use with a first seat and a second seat. The first seat has a first seatbelt, and the second seat has a second seatbelt. The first seat and the second seat are configured to be folded flat and to be arranged such that when the first seat and the second seat are folded flat, they cooperate to form an elongate horizontal surface. The cushion assembly includes, but is not limited to, an elongate cushion. The cushion assembly further includes, but is not limited to, a first seatbelt engaging portion that is disposed on an underside of the elongate cushion. The cushion assembly further includes a second seatbelt engaging portion disposed on the underside of the elongate cushion and spaced apart from the first seatbelt engaging portion by a first distance, the first distance corresponding with a second distance between the first seatbelt and the second seatbelt when the first seat and the second seat are folded flat and arranged to form the elongate horizontal surface. The cushion assembly still further includes, but is not limited to, a security belt engaged with the underside of the elongate cushion between the first seatbelt engaging portion and the second seatbelt engaging portion. The security belt is configured to extend around an upper surface of the elongate cushion.

BRIEF DESCRIPTION OF DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

An improved cushion assembly that addresses the issues described above in the Background Section is disclosed herein. In a non-limiting embodiment, the cushion assembly includes (1) a flexible, cushion having (2) an integrated belt to secure a passenger in a lying down position and also including (3) a feature that is configured for engagement with the seatbelts of the two seats that have been placed in the berthing configuration. In use, the seatbelts of the two seats are engaged with the cushion assembly via the said feature and thereby constrain the cushion assembly with respect to the two seats. When a passenger lies down on the cushion assembly, the integrated belt can be secured about the passenger to secure the passenger to the cushion assembly, and by extension, to the two seats that are arranged in the berthing configuration.

A greater understanding of the cushion assembly may be obtained through a review of the illustrations accompanying this application together with a review of the detailed description that follows.

Figure 1:
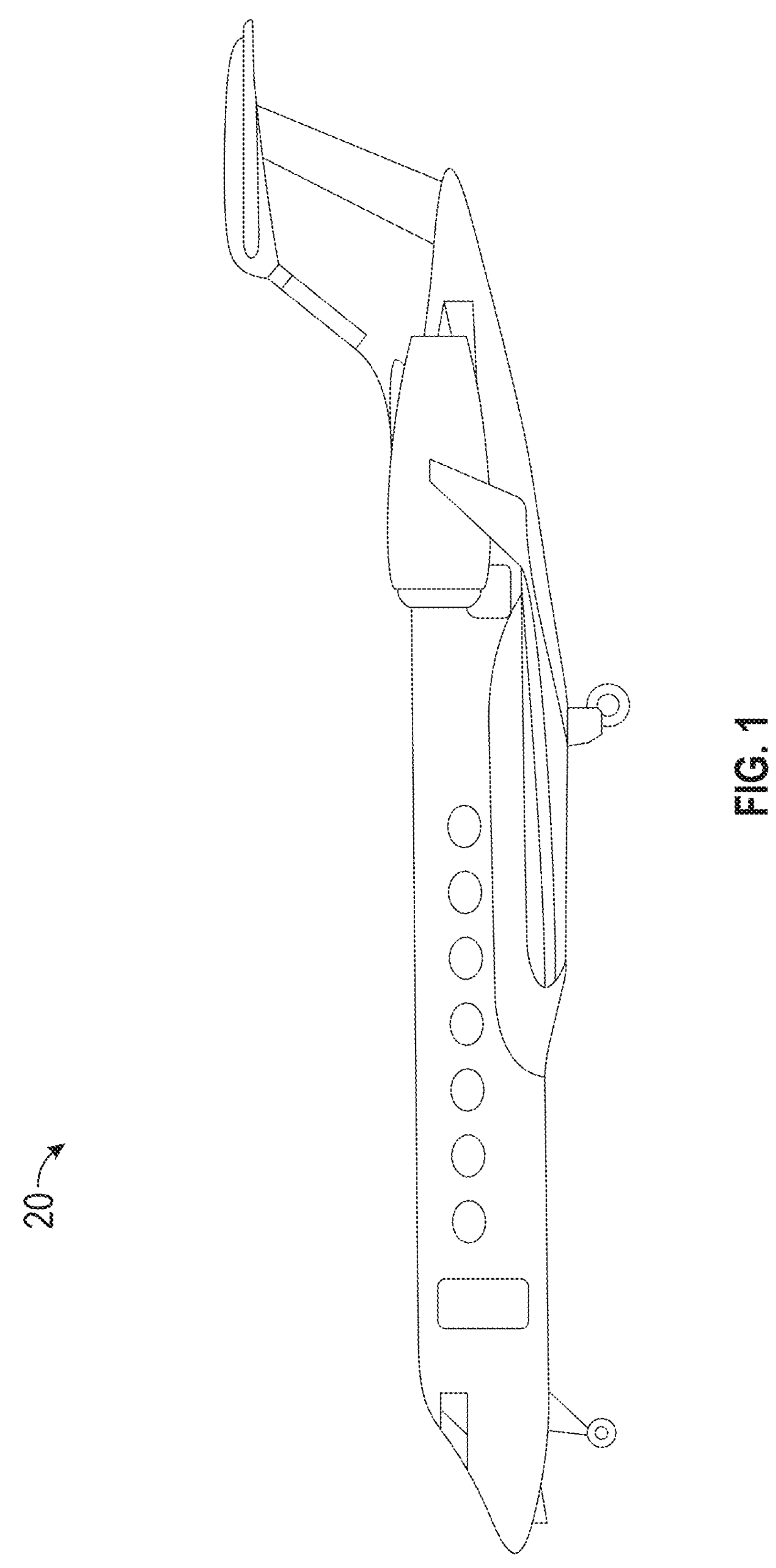
FIG. 1 is a side view illustrating a non-limiting embodiment of an aircraft suitable for use with the cushion assembly of the present disclosure.

FIG. 1 is a perspective view of a non-limiting embodiment of an aircraft 20 suitable for use with cushion assembly of the present disclosure. Aircraft 20 includes at least one set of seats that can be arranged in a tandem configuration (see FIGS. 16 and 17). These seats can be folded flat and arranged adjacent to one another such that their respective flat upper surfaces form a substantially continuous support surface on which a passenger may lie down. Further, each seat is equipped with a seatbelt that is configured to restrain a seated occupant.

In the illustrated embodiment, vehicle 20 is depicted as aircraft. While the cushion assembly disclosed herein is compatible for use onboard an aircraft, and while an aircraft is used as the context for the discussion that follows, it should be understood that the cushion assembly disclosed herein is not limited to such use. Rather, the cushion assembly disclosed herein is compatible with all types of vehicles.

Further, the cushion assembly disclosed herein is not limited to use with vehicles. Rather, the seat cushion of the present disclosure may be used in any conceivable application and/or environment that calls for comfortably securing an occupant lying down on the upper surface of seats that have been folded flat in any configuration or orientation without departing from the teachings of the present disclosure.

Figures 2, 3:
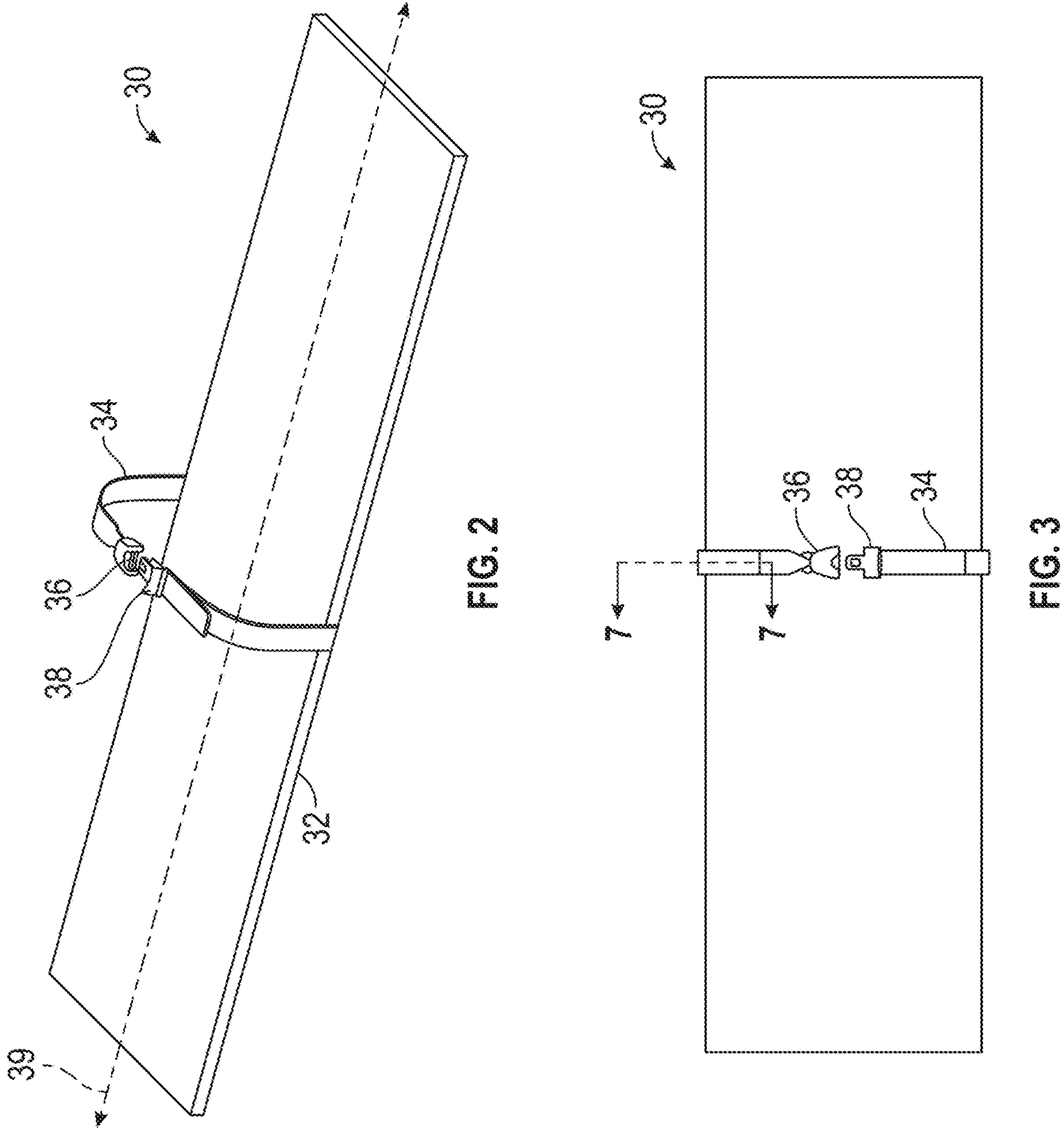
FIG. 2 is an isometric view illustrating a non-limiting embodiment of a cushion assembly made in accordance with the teachings of the present disclosure.
FIG. 3 is an overhead view illustrating the cushion assembly of FIG. 2.

With continuing reference to FIG. 1, FIG. 2 is an isometric view of a non-limiting embodiment of a cushion assembly 30 made in accordance with the teachings of the present disclosure. As is visible from this isometric view, cushion assembly 30 includes an cushion 32 and a belt 34. Cushion assembly 30 further includes additional features and components that will be discussed in detail in conjunction the views discussed below.

In the embodiment illustrated in FIG. 2, cushion 32 has an elongated rectangular planform configuration that makes cushion 32 well suited to be positioned on top of, for example, the two tandemly arranged seats disposed in the berthing configuration as discussed in the Background section above. In other embodiments, rather than having a rectangular planform configuration, cushion 32 may have a modified rectangular planform configuration having rounded corners, while in other embodiments, it may have an elliptical planform configuration, while in still other embodiments, it may have any other suitable geometric planform configuration that is effective to provide cushioning for the upper surface of the seats while they are disposed in the berthing configuration.

In the embodiment illustrated in FIG. 2, belt 34 is disposed at the center of cushion 32. In this position, belt 34 is well situated to envelope a human occupant's abdomen and thereby secure the human occupant to cushion assembly 30 during events that otherwise might have a tendency to dislodge the human occupant including, but not limited to, down drafts, turbulence or other acceleration forces imparted by movement of aircraft 20 (or any other vehicle in which cushion assembly 30 is situated.

In the illustrated embodiment, belt 34 includes a buckle 36 and a buckle engaging member 38 to permit a human occupant to selectively secure and/or release belt 34 from about his or her mid-section. Buckle engaging member 38 is configured to engage with buckle 36 to facilitate selective engagement. Buckle engaging member 38 is further configured to permit a human occupant to selectively tighten or loosen belt 34 about their abdomen. While belt 34 is depicted in FIG. 1 as being disposed at the exact center of cushion 32, it should be understood that in other embodiments, belt 34 may be spaced apart from an exact center of cushion 32 without deviating from the teachings of the present disclosure. In some embodiments, the longitudinal position of belt 34 along a longitudinal axis 39 of cushion 32 may be adjustable to accommodate human occupants of different heights and/or different proportions.

With continuing reference to FIGS. 1-2, FIG. 3 illustrates an overhead view of cushion assembly 30. Belt 34 is illustrated in an open configuration with buckle 36 and buckle engaging member 38 slightly spaced apart. This open configuration facilitates the engaging and disengaging of belt 34 about a human occupant's midriff.

With continuing reference to FIGS. 1-3, FIG. 4 is a side view illustrating cushion assembly 30 with belt 34 in a buckled configuration and in a distended position. This is the position that belt 34 would occupy if a human occupant were lying down on cushion assembly 30 with belt 34 buckled around his or her waist.

With continuing reference to FIGS. 1-4, FIG. 5 is an underside view illustrating the underside of cushion assembly 30. An elongated strap 40 is affixed to an underside of cushion 32. In an embodiment, elongated strap 40 may comprises a cargo strap, a leather strap, or it may comprise any other suitable material that is effective to robustly secure cushion assembly 30 to the seatbelts of the seats of aircraft 20 while the seats are disposed in the berthing configuration. Elongated strap 40 may be affixed to cushion 32 by any suitable process and/or means that is effective to form a secure attachment between these two components. In an embodiment, elongated strap 40 may be stitched onto the underside of cushion 32.

On the left side of elongated strap 40 is a seatbelt engaging feature 42. In the illustrated embodiment, seatbelt engaging feature 42 comprises a segment of elongated strap 40 that is free of stitches. In other words, it is a segment of elongated strap 40 that is not attached to cushion 32. This leaves this segment of elongated strap 40 (i.e., seatbelt engaging feature 42) adjacent to, but disconnected from, cushion 32. This disconnected configuration permits the seatbelt of one of the seats to pass between elongated strap 40 and the underside of cushion 32. When the seatbelt is passed through seatbelt engaging feature 42 and then secured in the conventional manner to its companion seatbelt engagement feature, the upper lefthand side (from the perspective of FIG. 5) of cushion 32 becomes secured to the seat. In the illustrated embodiment, another elongated strap (elongated strap 44) having another seatbelt engaging feature (seatbelt engaging feature 46) is disposed along the left side (from the perspective of FIG. 5) of the underside of cushion 32 and when the seatbelt is passed through seatbelt engaging feature 46 and secured in the conventional manner to its companion seatbelt engagement feature, it cooperates with seatbelt engaging feature 42 to secure cushion 32 to the seat. In other embodiments, different embodiments of a seatbelt engaging portion may be employed. For example, rather than having two spaced apart seatbelt engaging portions as illustrated, a single engagement portion extending from one lateral end of the underside of cushion 32 to the other lateral end may be employed without departing from the teachings of the present disclosure. In other embodiments, the seatbelt engaging features may not comprise a portion of elongated straps 40 and 44, but rather, they may comprise separate components that are attached to elongated straps 40 and 44 or to any other portion of cushion 32 that is effective to be coupled with such other seatbelt engaging features. In still other embodiments, any other means, feature, mechanism, fastener, or contrivance of any type or kind that is effective to engage with the seatbelt may be employed without departing from the teachings of the present disclosure.

Figures 4, 5:
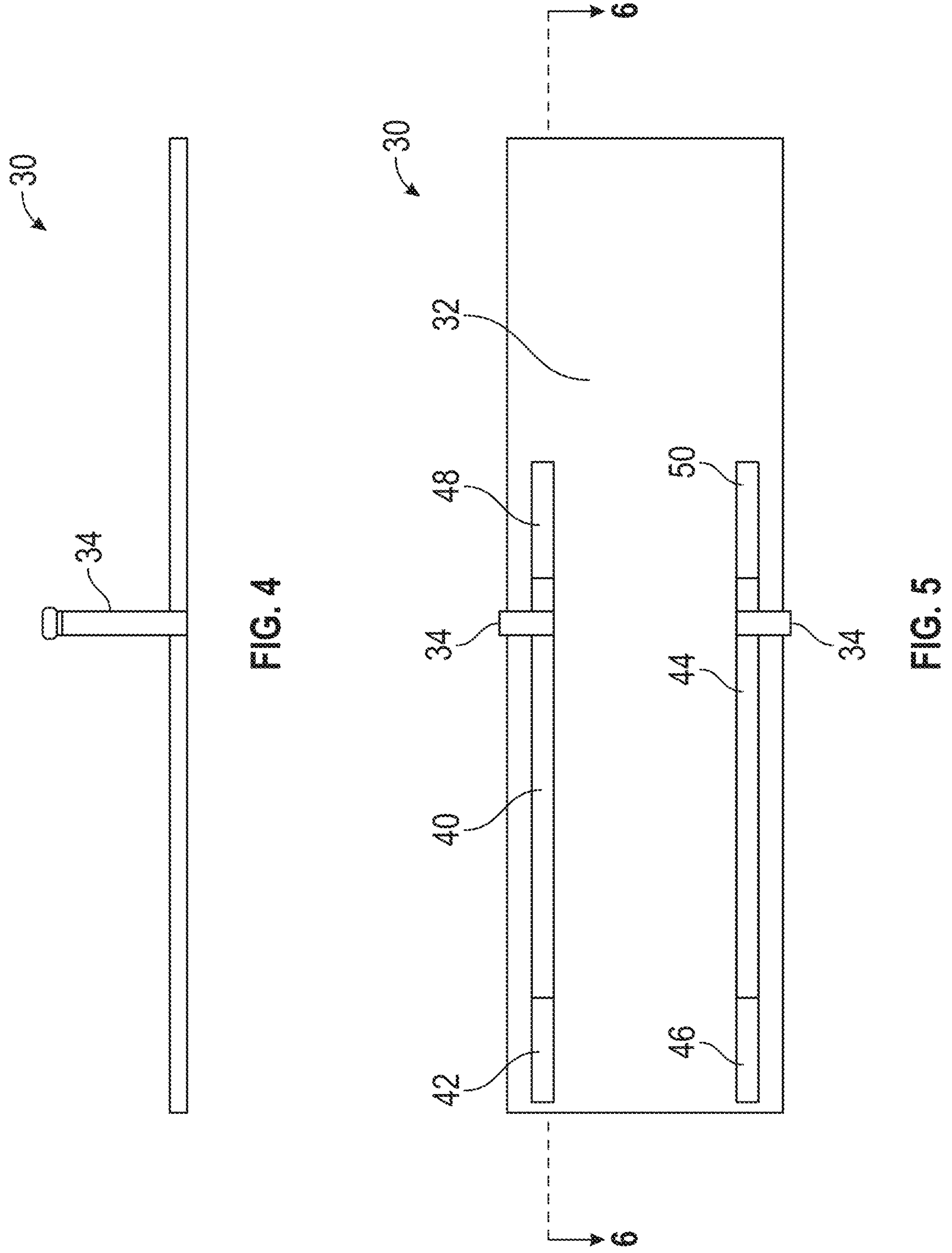
FIG. 4 is a side view illustrating the cushion assembly of FIG. 2.
FIG. 5 is a bottom view illustrating the cushion assembly of FIG. 2.
Figure 6:
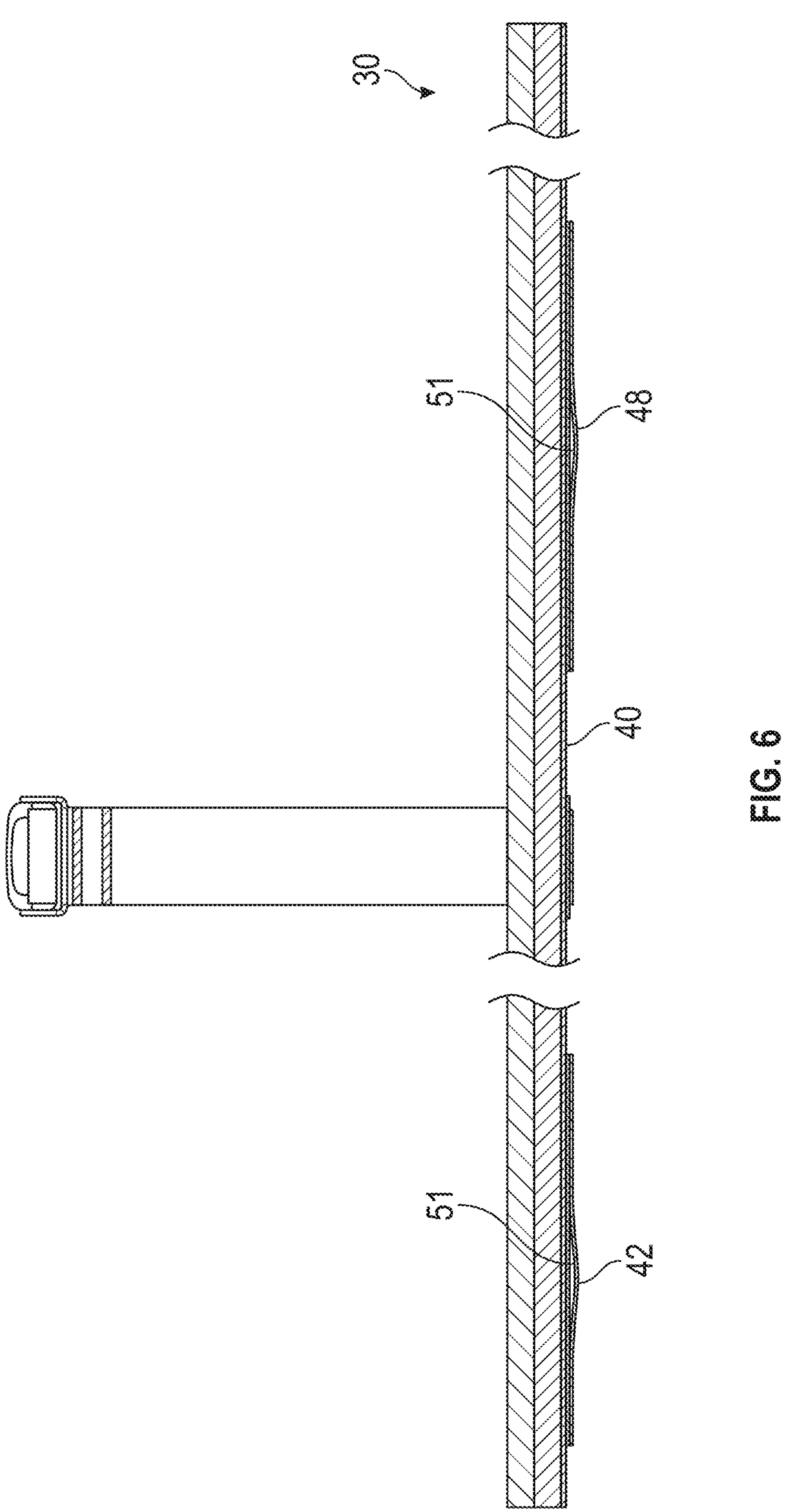
FIG. 6 is an expanded, fragmentary, cross-sectional view illustrating a portion of the cushion assembly of FIG. 2.

With continuing reference to FIG. 5, just to the right of a longitudinal center of cushion 32 is seatbelt engaging feature 48 and seatbelt engaging feature 50. In the illustrated embodiment, seatbelt engaging feature 48 and seatbelt engaging feature 50 have the same configuration as seatbelt engaging features 42 and 46, i.e., they constitute un-stitched segments of elongated strap 40 and of elongated strap 44 that permit the passage of the seatbelt from the second seat in the berthing configuration to pass between elongated strap 40 and elongated strap 44 to thereby restrain a center-right side portion of cushion 32 to the second seat. In the illustrated embodiment, the distance between seatbelt engaging portion 48 and seatbelt engaging portion 42 and also between seatbelt engaging portion 50 and seatbelt engaging portion 46 corresponds with the distance between the seatbelts of the two seats that are tandemly arranged when those two seats are placed in the berthing configuration. In other embodiments, the distance may correspond with the distance between the seatbelts of the seats while they are arranged in other configurations. For example, in some embodiments, the seats may be facing towards one another rather than being arranged tandemly. In such a configuration, seatbelt engaging portions 48 and 50 may be positioned closer to an end of cushion 32 that is opposite the end where seatbelt engaging portions 42 and 46 are located. It should be understood that in other embodiments, seatbelt engaging features 42, 46, 48, and 50 need not be segments of elongated straps 40 and 44, but rather, they may constitute any component that is configured to engage with the seatbelts of the two tandemly arranged seats and that is effective to secure cushion 32 to the upper surface of the two tandemly arranged seats through such engagement.

With continuing reference to FIG. 5, the underside of end portions of belt 34 are visible. In the illustrated embodiment, the end portions of belt 34 are stitched to elongated strap 40 and to elongated strap 44. In other embodiments, any other means or method may be employed to attach belt 34 to elongated straps 40 and 44 or to any other suitable portion of the underside of cushion 32.

With continuing reference to FIGS. 1-5, FIG. 6 is an expanded, fragmented, cross-sectional view illustrating a cut taken through cushion assembly 30 along line A-A of FIG. 5. In this view, the unstitched, the loose arrangement of the segments of elongated strap 40 that form seatbelt engaging feature 42 and 48 can be observed. As illustrated, at those segments of elongated strap 40, there is space 51 between elongated strap 40 and the underside of cushion 32. Also observable in this figure is the end portion of belt 34 in stitched engagement with elongated strap 40.

Figure 7:
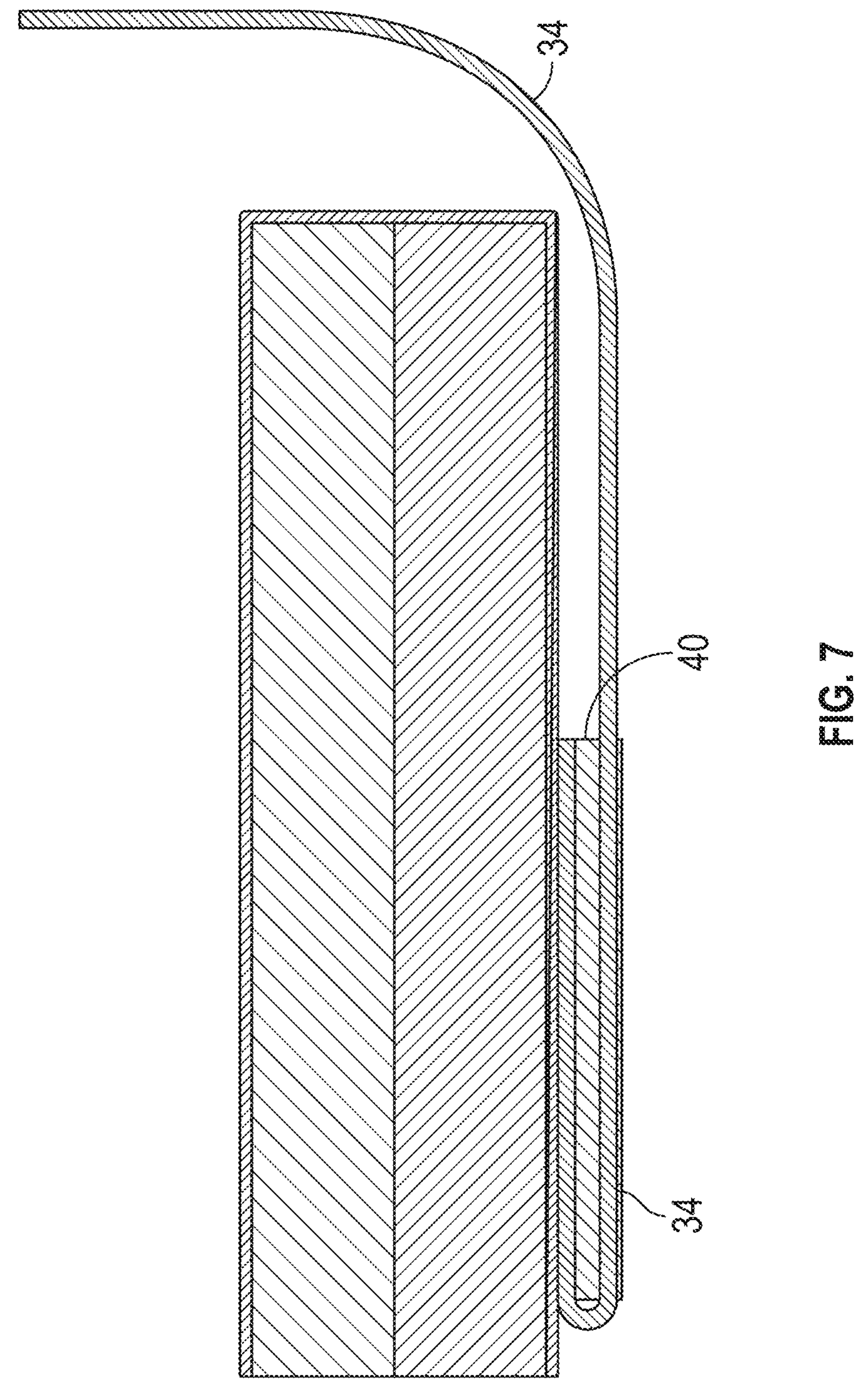
FIG. 7 is another expanded, fragmentary, cross-sectional view illustrating another portion of the cushion assembly of FIG. 2.

With continuing reference to FIGS. 1-6, FIG. 7 is an expanded, fragmented, cross-sectional view taken along the line B-B of FIG. 3. In FIG. 7, a wrapped-around relationship between belt 34 and elongated strap 40 can be observed. This configuration provides an engagement between belt 34 and elongated strap 40 that provides an increased robustness beyond that which would be provided by a coupling arrangement that relied solely on stitching.

With continuing reference to FIG. 7, a two-ply configuration of cushion 32 is illustrated. By providing cushion 32 with a two-ply configuration, different materials having differing properties may be employed, one being better suited for engagement with the tandem seats disposed in the berthing configuration and the other being better suited for engagement with the body of the human occupant. The two layers together may cooperate with one another to provide comfort to a human occupant that is superior to the comfort that would be provided by only a single layer.

With continuing reference to FIGS. 1-7, FIG. 8 is an isometric view that illustrates a seat 52 and a seat 54 aligned in a tandem arrangement and disposed in the berthing configuration. In the illustrated arrangement, seat 52 and seat 54 are seats that would typically be installed in a passenger cabin of a business jet, but it should be understood that any other type of seat that might be employed on any other type of vehicle could also serve as an appropriate platform on which to employ cushion assembly 30 without departing from the teachings of the present disclosure.

Figure 8:
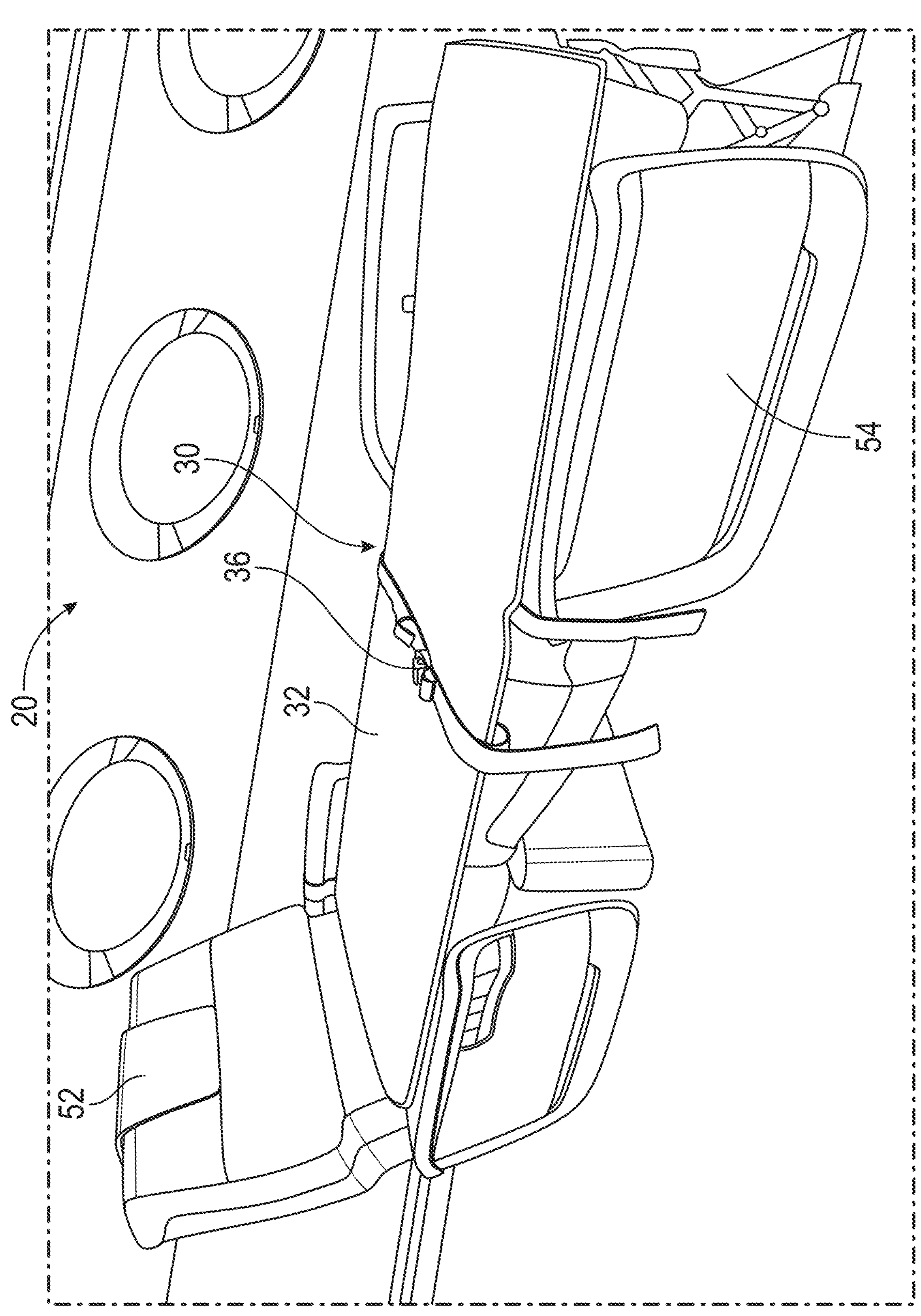
FIG. 8 is an isometric view illustrating the cushion assembly of FIG. 2 in a non-limiting environment of use.

In FIG. 8, cushion assembly 30 is engaged with seat 52 and seat 54 and is ready to receive and support a human occupant disposed in a lying down position. To assume a secure, lying down position on cushion assembly 30, a human occupant would simply unlatch buckle 36, lie down on cushion 32, re-engage buckle 36 with buckle engaging member 38, and then remain in that position until he or she wants to egress from the secured position. To egress from that position, the human occupant would unlatch buckle 36 to open belt 34 and then sit up and/or stand up to get out of the lying down position.

A procedure for deploying cushion assembly 30 and engaging cushion assembly 30 with seats 52 and 54 are discussed below in conjunction with FIGS. 9-15, below.

Figure 9:
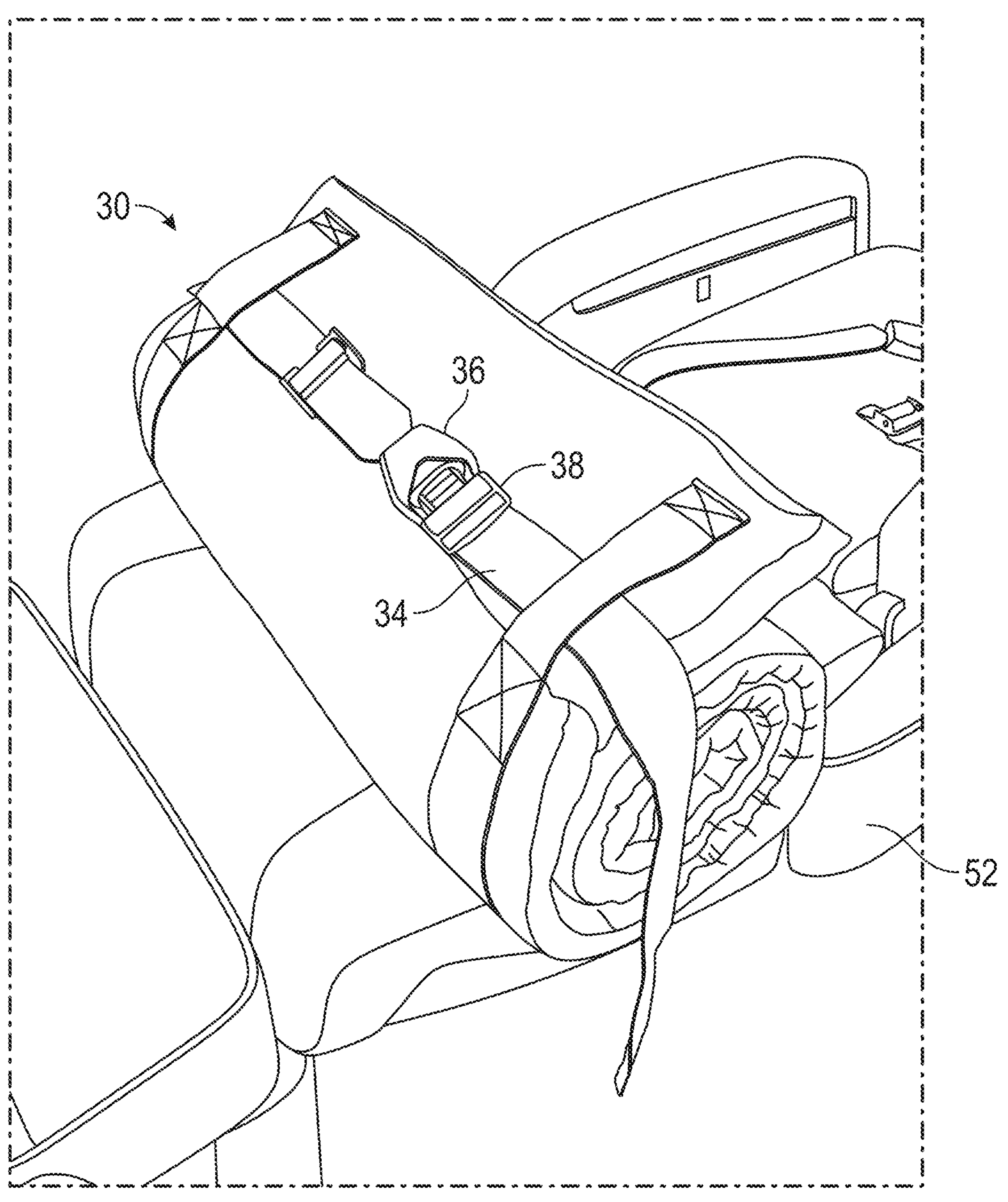
FIG. 9 is an isometric view illustrating the cushion assembly of FIG. 2 in a rolled-up state prior to deployment in the environment of use illustrated in FIG. 8.
Figure 10:
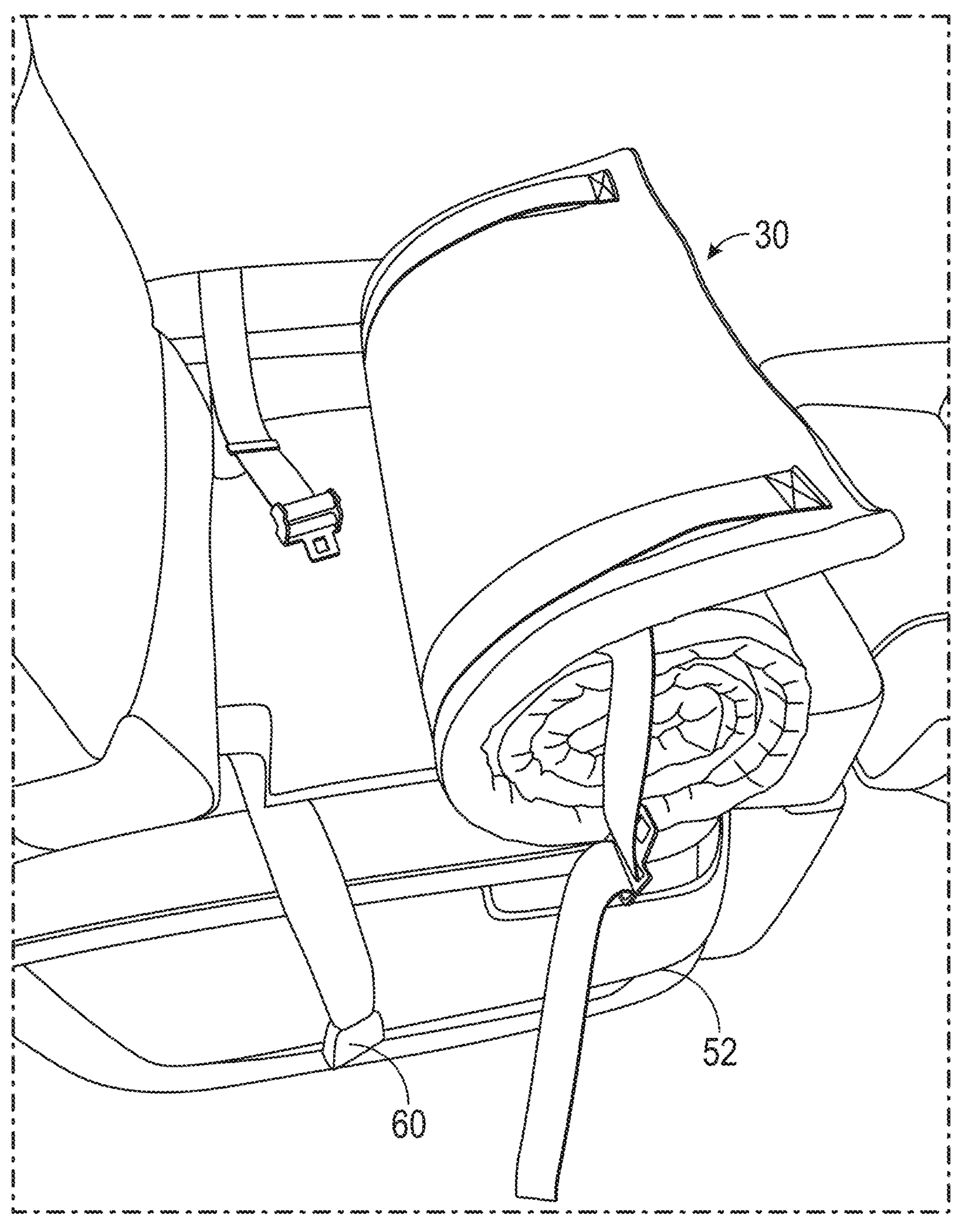
FIG. 10 is an isometric view illustrating the cushion assembly of FIG. 2 in an initial stage of deployment in the environment of use illustrated in FIG. 8.
Figure 11:
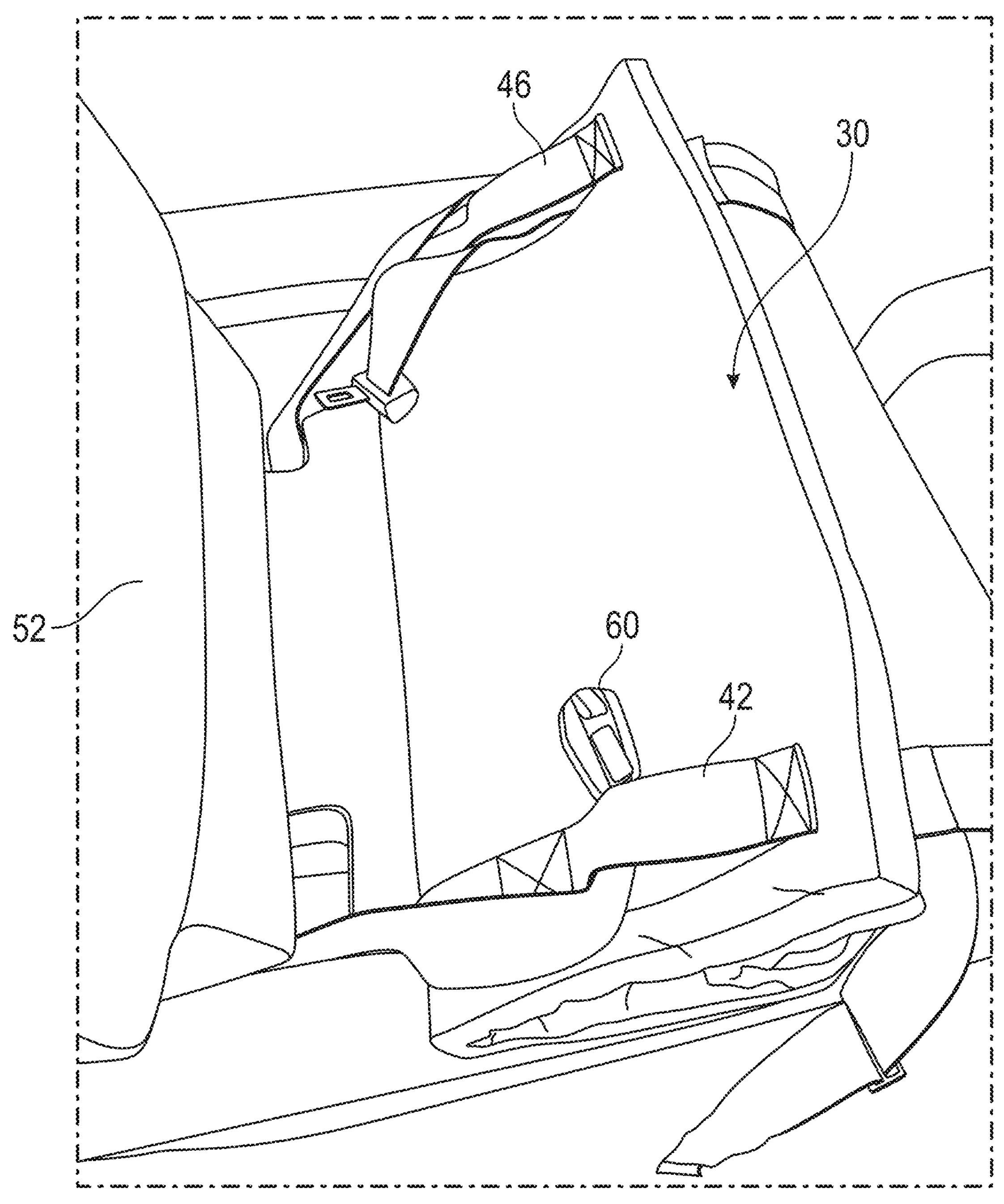
FIG. 11 is an isometric view illustrating the cushion assembly of FIG. 2 in a subsequent stage of deployment in the environment of use illustrated in FIG. 8.
Figure 12:
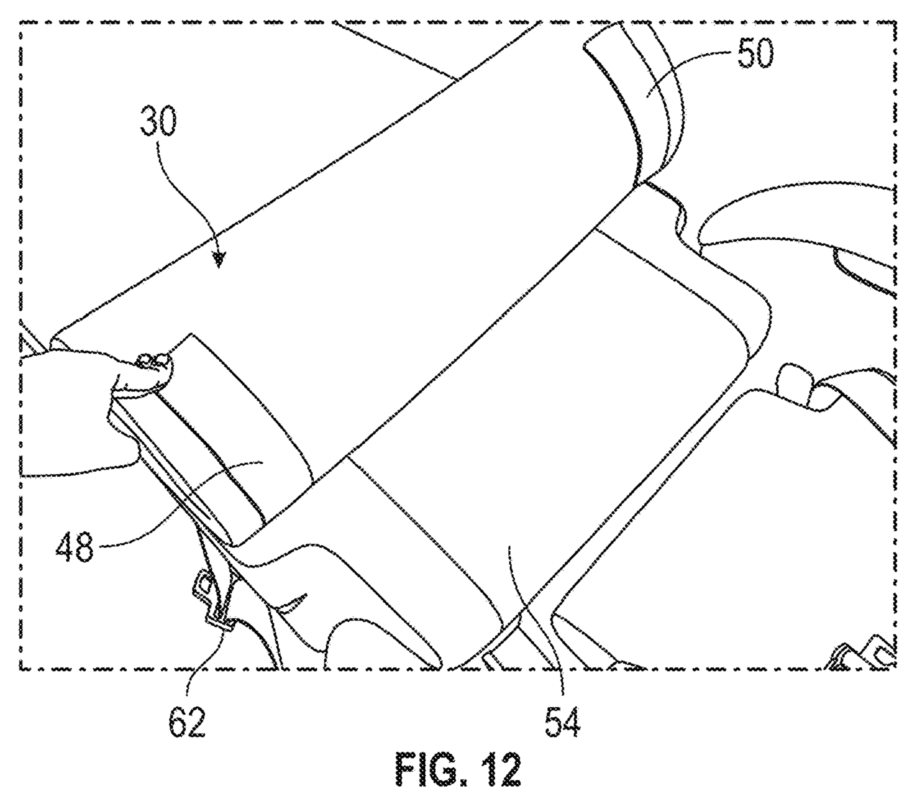
FIG. 12 is an isometric view illustrating the cushion assembly of FIG. 2 in a subsequent stage of deployment in the environment of use illustrated in FIG. 8.
Figure 13:
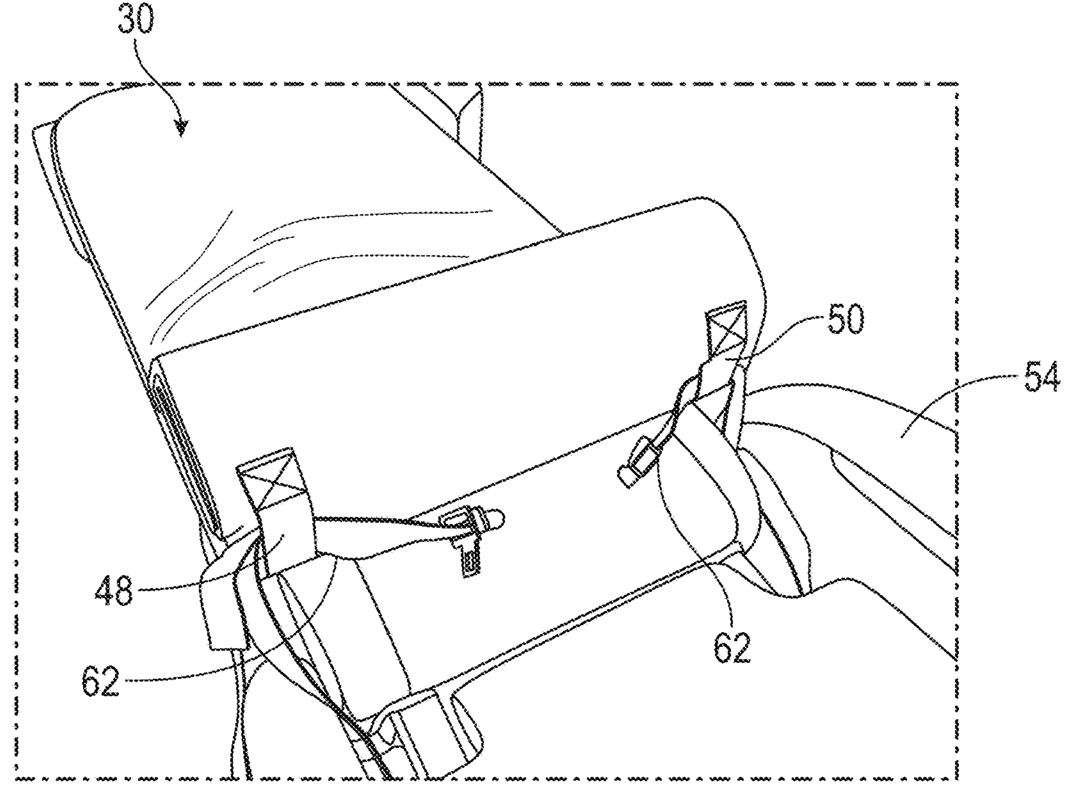
FIG. 13 is an isometric view illustrating the cushion assembly of FIG. 2 in a subsequent stage of deployment in the environment of use illustrated in FIG. 8.
Figures 14, 15:
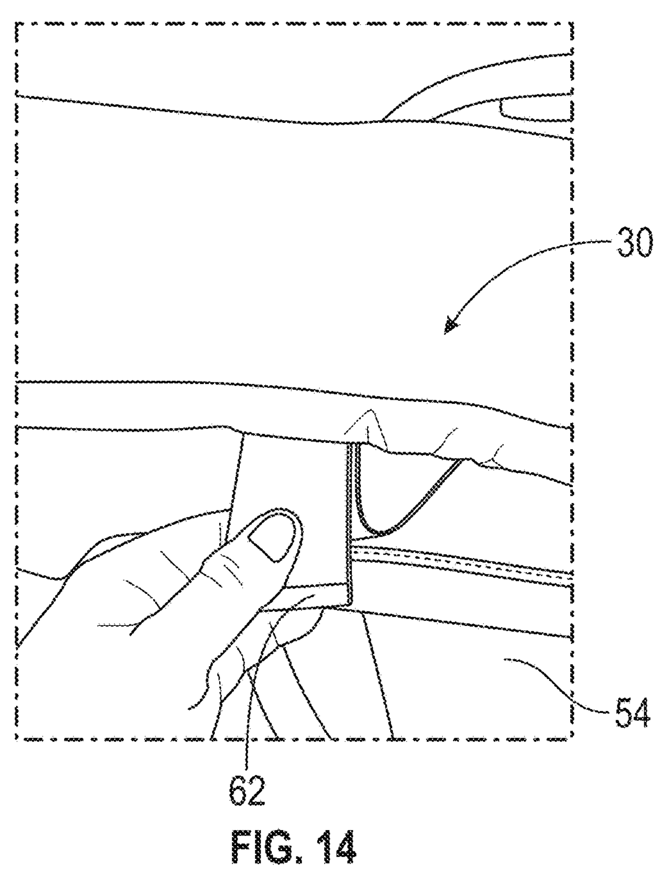
FIG. 14 is an isometric view illustrating the cushion assembly of FIG. 2 in a subsequent stage of deployment in the environment of use illustrated in FIG. 8.
FIG. 15 is an isometric view illustrating the cushion assembly of FIG. 2 in a subsequent stage of deployment in the environment of use illustrated in FIG. 8.

With continuing reference to FIGS. 1-8, FIG. 9 is an isometric view illustrating a first step of deploying cushion assembly 30. As part of this first step, cushion assembly 30 is unpacked. If cushion assembly 30 had been stored in a cabinet onboard aircraft 20 or if it had been sheathed in a carrying case, at this first step, cushion assembly 30 would be removed from its storage location and/or unsheathed and then positioned on seat 52 in an orientation such that its underside is facing the upper surface of seat 52. As illustrated in FIG. 9, belt 34 is positioned and configured such that when cushion assembly 30 is rolled up into a cylindrical configuration, buckle 36 and buckle engaging member 38, when latched, will secure cushion assembly 30 in the rolled-up configuration.

With continuing reference to FIGS. 1-9, FIG. 10 is an isometric view illustrating a second step of deploying cushion assembly 30. As part of this second step, belt 34 is unbuckled. Unbuckling belt 34 frees cushion assembly 30 to be unrolled when ready for deployment. As part of this step, cushion assembly 30 is positioned proximate a seatbelt 60 of seat 52.

With continuing reference to FIGS. 1-10, FIG. 11 is an isometric view illustrating a third step of deploying cushion assembly 30. As part of this third step, seatbelt 60 is passed through seatbelt engaging features 42 and 46. Once the buckle and buckle engaging portion of seat belt 60 have been passed through seat belt engaging features 42 and 46, they are buckled together to secure the upper end of cushion assembly 30 to seat 52.

With continuing reference to FIGS. 1-11, FIG. 12 is an isometric view illustrating a fourth step of deploying cushion assembly 30. As part of this fourth step, cushion assembly 30 is partially unrolled by hand onto seat 54. Cushion assembly 30 is unrolled to an extent where seatbelt engaging feature 48 and seatbelt engaging feature 50 are disposed proximate seatbelt 62 of seat 54.

With continuing reference to FIGS. 1-12, FIG. 13 is an isometric view illustrating a fifth step of deploying cushion assembly 30. As part of this fifth step, seatbelt 62 is passed through seatbelt engaging feature 48 and through seatbelt engaging feature 50 and then buckled together to secure this second portion of cushion assembly 30 to seat 54.

Figure 16:
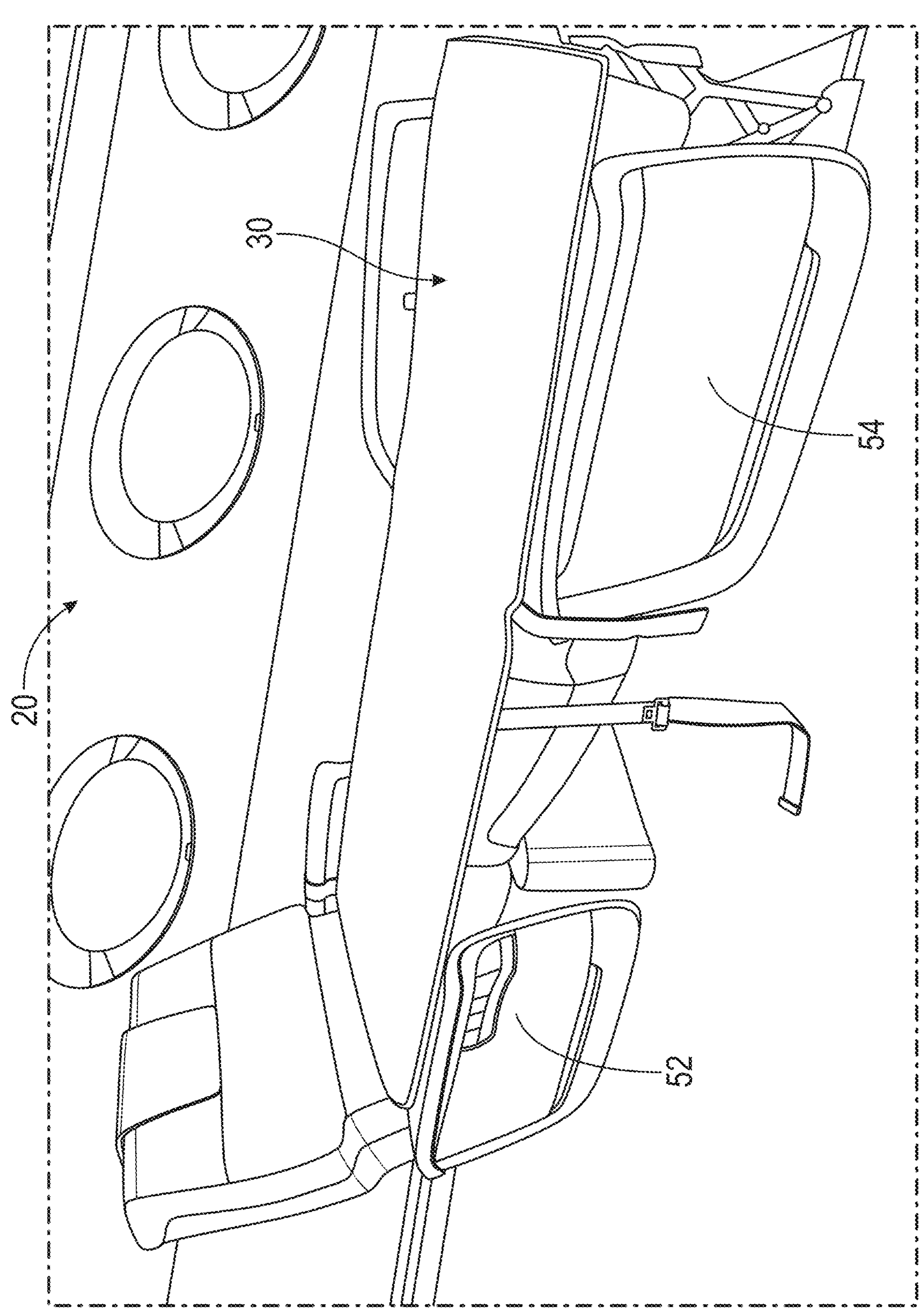
FIG. 16 is an isometric view illustrating the cushion assembly of FIG. 2 in a completed stage of deployment in the environment of use illustrated in FIG. 8.
Figure 17:
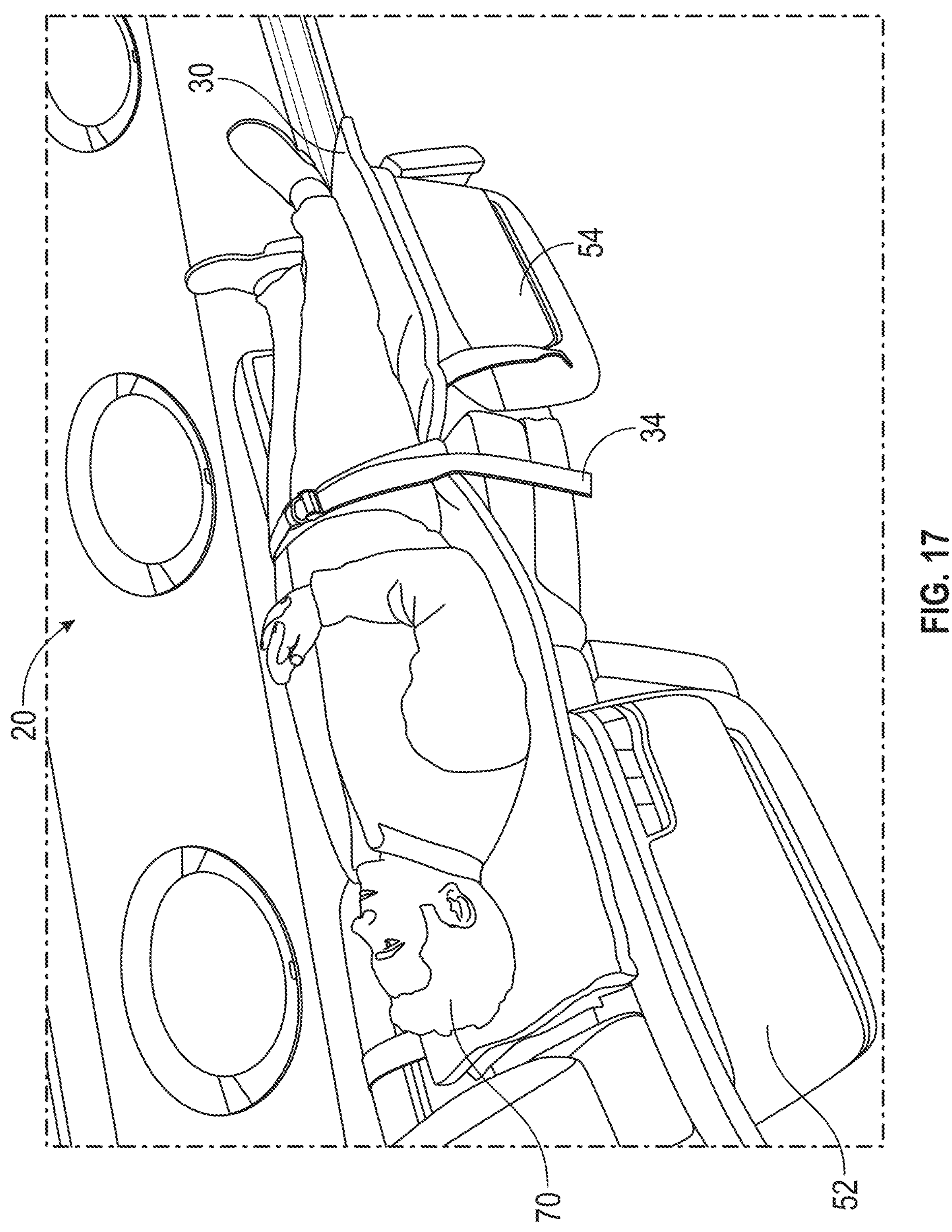
FIG. 17 is an isometric view illustrating the cushion assembly of FIG. 15 supporting a human occupant and securing the human occupant to the environment of use.

With continuing reference to FIGS. 1-14, FIG. 14 and FIG. 15 are isometric views illustrating different stages of a sixth step of deploying cushion assembly 30. As part of this sixth step, seatbelts 60 and 62 are tightened to secure cushion assembly 30 to seats 52 and 54, respectively. As illustrated in FIG. 16 (discussed below), cushion assembly 30 is now unrolled, secured, and ready to receive a human occupant.

With continuing reference to FIGS. 1-5, FIG. 16 is an isometric view illustrating seats 52 and 54 disposed in the berthing configuration with cushion assembly 30 mounted thereto. In FIG. 16, cushion assembly 30 is ready to receive a human occupant.

With continuing reference to FIGS. 1-16, FIG. 17 is an isometric view illustrating seats 52 and 54 disposed in the berthing configuration with cushion assembly 30 mounted thereto. A human occupant 70 is positioned in a lying down orientation on top of cushion assembly 30 with belt 34 fastened about his midriff. In this manner, human occupant is restrained by cushion assembly 30 to remain in seats 52 and 54 despite turbulence, acceleration, change in attitude, or any other sudden change in direction of aircraft 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A cushion assembly for use with a support surface having a first restraint component and a second restraint component spaced apart from the first restraint component, the cushion assembly comprising:

a cushion;

a first engagement component coupled with the cushion, the first engagement component configured to engage the first restraint component; and a second engagement component coupled with the cushion, the second engagement component configured to engage the second restraint component, wherein the first engagement component and the second engagement component are coupled to an underside of the cushion such that:

opposite ends of the first engagement component are each coupled with the underside of the cushion and a first intermediate portion of the first engagement component is uncoupled from the underside of the cushion; and opposite ends of the second engagement component are each coupled with the underside of the cushion and a second intermediate portion of the second engagement component is uncoupled from the underside of the cushion.

2. The cushion assembly of claim 1, further comprising a third restraint component coupled with the cushion, the third restraint component configured to secure a human occupant to the cushion.

3. The cushion assembly of claim 2, wherein the third constraining component comprises a seatbelt.

4. The cushion assembly of claim 2, wherein the third constraint component is coupled with the cushion at a longitudinal center of the cushion.

5. The cushion assembly of claim 1, the support surface comprising a plurality of support elements and the first restraint component and the second constraint component each being associated with different support elements of the plurality of support elements, wherein the cushion extends across at least a portion of each support element of the plurality of support elements when the first engagement component is coupled with the first restraint component and when the second engagement component is coupled with the second restraint component.

6. The cushion assembly of claim 1, the plurality of support elements comprising a plurality of seats arranged tandemly, each seat of the plurality of seats being disposed in a flat configuration, the first restraint component comprising a first seatbelt, and the second constraint component comprising a second seatbelt, wherein the first engagement component is configured to engage with the first seatbelt, and wherein the second engagement component is configured to engage with the second seatbelt.

7. The seat assembly of claim 1, wherein the first engagement component and the second engagement component each comprise a fabric material.

8. The seat assembly of claim 7, wherein the fabric material comprises a cargo strap.

9. The cushion assembly of claim 1:

wherein the first engagement component and the second engagement component are each partially attached to the cushion at longitudinally spaced apart locations, wherein a first intermediate portion of the first engagement component is detached from the cushion, wherein a second intermediate portion of the second engagement component is detached from the cushion, and wherein the first intermediate portion is configured to form a first opening between the first engagement portion and the cushion, the first opening configured to receive the first constraint component, and wherein the second intermediate portion is configured to form a second opening between the second engagement portion and the cushion, the second opening configured to receive the second constraint component.

10. The cushion assembly of claim 1, wherein the first engagement component and the second engagement components comprise spaced apart portions of a single member.

11. The cushion assembly of claim 1, wherein the first engagement component and the second engagement component are coupled to an underside of the cushion.

12. The cushion assembly of claim 1, wherein the cushion comprises an upper cushion portion and a lower cushion portion, the upper cushion portion having a different resistance to compression than the lower cushion portion.

13. The cushion assembly of claim 12, wherein the upper cushion portion has a lower resistance to compression than the lower cushion portion.

14. The cushion assembly of claim 1, wherein the cushion comprises an elongate body having a length sufficient to extend beneath an entire length of a human occupant disposed in a horizontal orientation.

15. The cushion assembly of claim 1, wherein the first engagement component and the second engagement component are each disposed along an underside of the cushion at locations corresponding with the spaced apart locations of the first constraint component and the second constraint component when the cushion is disposed on the support surface.

16. The cushion assembly of claim 1, the support surface comprising a plurality of seats onboard an aircraft, the plurality of seats being tandemly arranged and folded flat, wherein the first engagement component and the second engagement component are each configured to secure the cushion to the plurality of seats.

17. The cushion assembly of claim 1, wherein the cushion is configured to be rolled into a cylindrical configuration when the cushion assembly is not secured to the support surface.

18. The cushion assembly of claim 17, further comprising a third constraint component, the third constraint component being configured to retain the cushion in the cylindrical configuration when the cushion is rolled into the cylindrical configuration.

19. The cushion assembly of claim 1:

wherein the cushion assembly further comprises a third engagement component coupled with the cushion and a fourth engagement component coupled with the cushion, wherein the fourth engagement component is longitudinally spaced apart from the third engagement component, wherein the third engagement component is laterally spaced apart from, and laterally aligned with, the first engagement component, and wherein the fourth engagement component laterally spaced apart from, and laterally aligned with, the second engagement component.

20. A cushion assembly for use with a first seat and a second seat, the first seat having a first seatbelt and the second seat having a second seatbelt, the first seat and the second seat being configured to be folded flat and to be arranged such that when the first seat and the second seat are folded flat, they cooperate to form an elongate horizontal surface, the cushion assembly comprising:

an elongate cushion;

a first seatbelt engaging portion disposed on an underside of the elongate cushion;

a second seatbelt engaging portion disposed on the underside of the elongate cushion and spaced apart from the first seatbelt engaging portion by a first distance, the first distance corresponding with a second distance between the first seatbelt and the second seatbelt when the first seat and the second seat are folded flat and arranged to form the elongate horizontal surface; and a security belt engaged with the underside of the elongate cushion between the first seatbelt engaging portion and the second seatbelt engaging portion, the security belt configured to extend around an upper surface of the elongate cushion, wherein the first seatbelt engaging portion and the second seatbelt engaging portion are coupled to an underside of the elongate cushion such that:

opposite ends of the first seatbelt engaging portion are each coupled with the underside of the elongate cushion and a first intermediate portion of the first seatbelt engaging portion is uncoupled from the underside of the elongate cushion; and opposite ends of the second seatbelt engaging portion are each coupled with the underside of the elongate cushion and a second intermediate portion of the second seatbelt engaging portion is uncoupled from the underside of the elongate cushion.

* * * * *